United States Patent [19]

Horning et al.

[11] 4,107,404

[45] Aug. 15, 1978

[54] STABILIZATION OF LIASF$_6$/DIMETHYL SULFITE ELECTROLYTE SOLUTION

[75] Inventors: Robert J. Horning, Sellersville; Walter B. Ebner, Hartsville, both of Pa.

[73] Assignee: The United States of America as represented by the Secretary of the Army, Washington, D.C.

[21] Appl. No.: 833,401

[22] Filed: Sep. 15, 1977

Related U.S. Application Data

[63] Continuation of Ser. No. 764,489, Jan. 31, 1977.

[51] Int. Cl.$^2$ ............................................. H01M 6/14
[52] U.S. Cl. .................................................... 429/194
[58] Field of Search ............... 429/194, 197; 252/62.2, 252/182.1, 425, 500, 512

[56] References Cited

U.S. PATENT DOCUMENTS

| | | | |
|---|---|---|---|
| 3,877,988 | 4/1975 | Dey et al. | 429/194 |
| 3,985,577 | 10/1976 | Russell | 429/194 |
| 3,998,658 | 12/1976 | Dey | 429/194 |

Primary Examiner—Charles F. LeFevour
Attorney, Agent, or Firm—Nathan Edelberg; Harold H. Card, Jr.; A. Victor Erkkila

[57] ABSTRACT

LiAsF$_6$/dimethyl sulfite electrolyte solutions of improved storage stability are obtained by incorporating metallic lithium therein.

3 Claims, No Drawings

STABILIZATION OF LIASF$_6$/DIMETHYL SULFITE ELECTROLYTE SOLUTION

GOVERNMENTAL INTEREST

The invention described herein was made in the course of a contract with the U.S. Government.

This is a continuation of application Serial No. 764,489, filed Jan. 31, 1977.

BACKGROUND OF THE INVENTION

Solutions of lithium hexaflouroarsenate (LiAsF$_6$) in dimethyl sulfite (DMSI) have found use as electrolyte in lithium cells and batteries. It is important that such electrolyte solutions possess good stability so as to be suitable for use as an electrolyte in lithium reserve cells requiring long term storage at temperatures ranging from $-40°$ F. to $+165°$ F., as required by U.S. Army military specifications. However, such solutions, when stored at elevated temperatures in sealed glass containers are unstable and deteriorate, as shown by the development of a bronzy discoloration and the generation of gaseous products, which can eventually lead to rupture of the container.

SUMMARY AND DETAILED DESCRIPTION OF THE INVENTION

An object of the present invention is to provide a method for increasing the stability of LiAsF$_6$/DMSI electrolyte solutions.

Another object is to provide LiAsF$_6$/DMSI electrolyte solutions of increased stability.

Other objects will become apparent as the invention is further described.

It has now been unexpectedly found that the foregoing objects can be achieved by incorporating a small amount of metallic lithium in the LiAsF$_6$ solution in dimethyl sulfite.

The following example serves to illustrate a specific embodiment of method and compositions of this invention.

EXAMPLE 1

Part A

A one molar solution of LiAsF$_6$ in dimethyl sulfite was prepared by dissolving lithium hexafluoroarsenate, a product of high purity manufactured by U.S. Steel Corp., in dimethyl sulfite, manufactured by Eastman Kodak Co., Rochester, N.Y.

PART B

In a first group of experiments 14 pyrex glass ampuls of slightly more than 1 ml. capacity were each charged with 1 ml. of the electrolyte solution prepared in Part A and then hermetically sealed.

In a second group of experiments 14 similar pyrex glass ampuls were each charged with 1 ml. of the electrolyte solution prepared in Part A together with 2.1 mg. of pure lithium metal wire, and then hermetically sealed.

Both groups of ampuls were then placed in an oven maintained at 165° F. All ampuls of the first group containing no lithium metal ruptured within 95 days storage at 165° F. due to generation of gaseous decomposition products, and the electrolyte solution contained therein developed a strong bronze descoloration. By contrast none of the ampuls containing the lithium metal stabilizer had ruptured even after storage at 165° F. for 934 days, when they were most recently inspected, and the electrolyte solutions therein remained clear and free from discoloration.

A small amount of lithium metal, e.g. 0.1 milligram per milliliter of solution, is ordinarily effective to increase the storage stability of a LiAsF$_6$/DMSI solution. Generally, the degree of stabilization conferred on the solution increases in proportion to the amount of lithium metal added thereto up to a maximum after which no further advantage is observed. Also, the degree of stabilization obtained by lithium metal in such solutions is dependent on the purity of the LiAsF$_6$ as well as of the DMSI and to a lesser extent on other factors, such as the concentration of the electrolyte. Moisture and acidic impurities, such as HF and So$_2$, in the LiAsF$_6$ and DMSI employed accelerate the decomposition of the electrolyte solution even when lithium metal stabilizer is present, although usually to a lesser degree than when lithium metal is absent. Further, the lithium metal is effective for increasing the stability of LiAsF$_6$ solutions in DMSI ranging in concentration up to a saturated solution. In particular, the present invention is suitable for stabilizing electrolyte solutions ranging about from 0.5 to 2 molar LiAsF$_6$, which are especially desirable for use in high density lithium electric batteries and in which the DMSI can be employed in mixture with other solvents, e.g. methyl formate in known manner.

Gaseous samples taken from stored LiAsF$_6$/DMSI solutions containing no lithium metal stabilizer and analyzed by gas chromatography and mass spectroscopic analysis, indicate that the gaseous decomposition products are essentially sulfur dioxide and dimethyl ether, which result from hydrolysis of the solvent by reaction with the moisture usually present in the LiAsF$_6$ and DMSI in trace amounts, e.g. 200-500 ppm. and are responsible for the pressure rise in the sealed containers accompanying the decomposition of the LiAsF$_6$/DMSI solution. These products suggest the following decomposition mechanism:

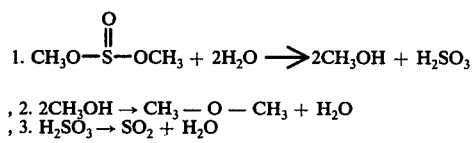

, 2. $2CH_3OH \rightarrow CH_3 - O - CH_3 + H_2O$
, 3. $H_2SO_3 \rightarrow SO_2 + H_2O$ The foregoing disclosure is merely illustrative of the principles of this invention and is not to be interpreted in a limiting sense. We wish it to be understood that we do not desire to be limited to the exact details of construction shown and described, because obvious modifications will occur to a person skilled in the art.

What is claimed is:

1. A process for stabilizing an electrolyte consisting essentially of a solution of lithium hexafluoroarsenate in dimethyl sulfite prior to contact with an anode and a cathode to produce an electrochemical cell, which comprises incorporating therein lithium metal in an effective amount to increase the storage stability of said solution.

2. A process according to claim 1, wherein the amount of lithium metal is at least 0.1 milligram per milliliter of the solution.

3. A process according to claim 2, wherein the concentration of the solution is within the range about from 0.5 to 2 molar lithium hexaflouroarsenate.

* * * * *